Sept. 15, 1936.  D. W. HOFERER  2,054,321
CRANKPIN CONSTRUCTION
Filed April 26, 1935
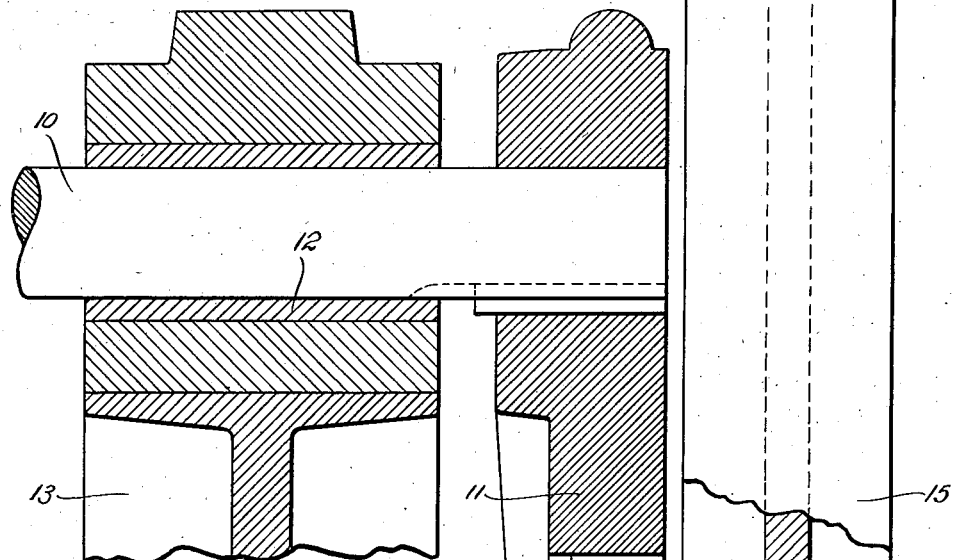
*Fig. 1.*
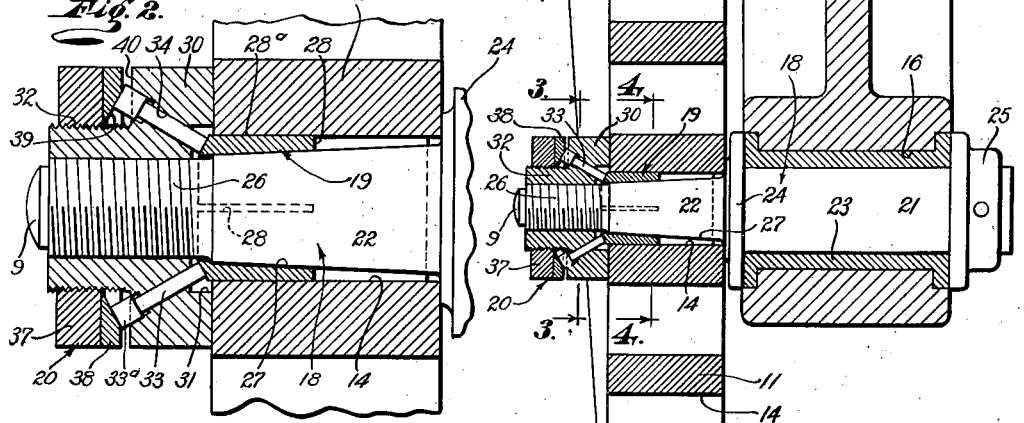
*Fig. 2.*
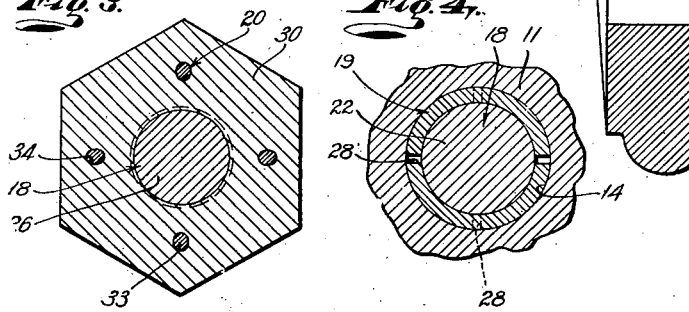
*Fig. 3.*  *Fig. 4.*
Inventor
DANIEL W. HOFERER
By
His Attorney Patented Sept. 15, 1936

2,054,321

UNITED STATES PATENT OFFICE 2,054,321

CRANKPIN CONSTRUCTION

Daniel W. Hoferer, Long Beach, Calif.

Application April 26, 1935, Serial No. 18,454

10 Claims. (Cl. 287—20)

This invention relates to a wrist pin or crank pin construction and relates more particularly to a crank pin assembly or construction adapted for use in well drilling and pumping rigs and like situations.

Well drilling and pumping rigs usually embody a walking beam pivoted or oscillated by a pitman and a driven shaft carrying an eccentric or crank arm which is operatively connected to the pitman by a wrist pin or crank pin. The crank arms of the rigs are usually provided with a plurality of openings spaced different distances from the axis of the shaft and adapted to receive the crank pin, whereby the stroke of the walking beam may be changed as desired. These openings in the crank arms are supposed to be of the same diameter. However, in practice the openings often vary considerably in size and the common crank pins sometimes fit the openings very loosely. This loose or improper fitting of the pins in the openings causes excessive wear and sometimes results in breakage of the pins. When this breakage occurs the crank arm and its shaft usually require replacement and sometimes great damage is done to the well due to the failure of the pump rods, etc.

A general object of the present invention is to provide a simple, practical crank pin assembly or construction that may be readily adjusted to properly fit openings varying considerably in size and to compensate for wear.

Another object of the invention is to provide a crank pin construction that is long wearing and that may be used for a long period without danger of wearing the opening in the crank arm out of round.

Another object of the invention is to provide a crank pin construction that embodies a sleeve or bushing for mounting the pin in an opening in a crank arm, which bushing may be adjusted or expanded at will to maintain the proper tight fitting or bearing of the pin in the opening.

Another object of the invention is to provide a crank pin construction of the character mentioned in which the bushing may be easily adjusted or expanded without loosening or otherwise disturbing the nut for retaining the pin in the opening.

Another object of the invention is to provide the combination of an internally tapered bushing for mounting a crank pin in an opening and a novel effective means for adjusting or expanding the bushing.

A further object of the invention is to provide a crank pin construction of the character mentioned in which the nut for retaining the pin in the bore or opening of the crank arm may have ample extensive threaded engagement with the pin.

The various objects and features of my invention will be fully understood from the following detailed description of a typical preferred form and application of the invention, throughout which description reference is made to the accompanying drawing, in which:

Fig. 1 is a vertical or longitudinal detailed sectional view of a portion of a mechanism illustrating the crank pin construction of the invention operatively connecting a crank arm and a pitman. Fig. 2 is an enlarged fragmentary longitudinal detailed sectional view of the crank pin construction and the adjacent portion of the crank arm, and Figs. 3 and 4 are enlarged transverse detailed sectional views taken as indicated by lines 3—3 and 4—4, respectively, on Fig. 1.

In the following detailed disclosure I will describe a typical form of the invention in conjunction with the crank arm and pitman of a well drilling and pumping rig. It is to be understood that the invention may be embodied in forms for use in various situations and the invention is not to be construed as limited to the specific form or application about to be described.

The drawing illustrates a rotatable shaft 10 carrying an eccentric or crank arm 11. The shaft 10 is rotatably supported by a bearing 12 in an opening in a support or post 13. In accordance with the usual practice the crank arm 11 has a plurality of longitudinally spaced transverse openings 14 for receiving a wrist pin or crank pin. A pitman 15 is arranged in spaced parallel relation to the outer side of the crank arm 11 and has a transverse opening 16 in its outer portion to receive a portion of the crank pin. The parts just described are merely typical and are not to be taken as restricting the application or use of the invention.

The crank pin assembly or construction provided by this invention includes, generally, a pin 18, an expansible bushing 19 for mounting a portion of the pin 18 in an opening 14 of the crank arm 11 and means 20 for adjusting or expanding the bushing 19.

The pin 18 is an elongate part or member comprising a bearing portion 21 to operate in the opening 16 of the pitman 15 and a portion 22 to be mounted in an opening 14 of the crank arm 11. In accordance with the usual practice the opening 16 in the pitman is provided with a bushing 23 to carry the portion 21 for free rotative or pivotal movement relative to the pitman. The portion 21 of the crank pin 18 may be cylindrical and of substantial diameter. An annular radial thrust flange 24 is provided at the inner end of the portion 21 to cooperate with the inner end of the bushing 23. A nut or thrust plate 25 may be keyed to the projecting outer end of the portion 21 to cooperate with the outer end of the bushing 23 and prevent displacement of the crank pin from the bushing.

In accordance with the invention the portion 22 of the crank pin 18 for extending through the opening 14 is longitudinally tapered. The portion 22 is tapered outwardly or toward the inner side of the crank arm 11 and is round in transverse cross section. In the preferred construction the portion 22 is accurately machined and its taper is constant or uniform. The tapered portion 22 of the crank pin is substantially as long as the opening 14 and at its largest point is smaller in diameter than the opening. A screw threaded extension or stem portion 26 is provided on the inner end of the pin 18 to project from the inner side of the crank arm 11. A reduced knob 9 may be provided on the inner end of the portion 26 to receive blows when removing the pin. The crank pin 18 just described may be a simple integral member or part as illustrated throughout the drawing.

The bushing 19 is provided to support or mount the portion 22 in an opening 14 of the crank arm 11. The bushing 19 surrounds the portion 22 of the crank pin and in accordance with the invention is expansible to properly and tightly fit openings varying in diameter. The expansible bushing 19 is an elongate tubular member having a central longitudinal opening 27 carrying or receiving the portion 22. The bushing 19 is cylindrical. That is, its peripheral or outer surface 28ᵃ is cylindrical to bear on the wall of the opening 14. The internal surface of the bushing 19 is longitudinally tapered so that the bushing constitutes an expansible wedge member or bushing. The taper or pitch of the interior of the bushing 19 is such that it may evenly and properly bear on the tapered portion 22 of the crank pin. The interior of the bushing 19 is preferably tapered throughout the length of the bushing and the bushing is proportioned to project some distance from the inner side of the crank arm 11 when arranged in an average opening of the crank arm. The inner end of the bushing 19 may be enlarged and has an inclined end face. The bushing 19 is longitudinally split to be readily adjustable or expansible. If desired the bushing 19 may be divided into halves or sections. However, it is preferred to provide longitudinal slots 28 in the bushing to make it expansible. The slots 28 are circumferentially spaced and extend substantially halfway through the bushing from its opposite ends. As initially formed the internal diameter of the bushing 19 may be slightly less than the pin portion 22 so that it may tightly fit on the portion when arranged in its proper position.

A retaining nut 30 is screw-threaded on the stem portion 26 of the crank pin 18 to retain the pin in its proper position with relation to the crank arm 11. The retaining nut 30 is adapted to bear or react against the inner side of the crank arm 11. In accordance with the invention the nut 30 may have sufficient length or thickness to have extensive threaded engagement with the stem portion 26. An annular socket or recess 31 is provided in the inner side of the nut 30 to receive the projecting end portion of the bushing 19. The recess 31 is proportioned to receive the end part of the bushing 19 with suitable clearance. The retaining nut 30 is flat sided or polygonal in its general configuration and has an outer cylindrical portion 32. The outer portion 32 of the nut 30 is preferably of reduced diameter and is screw-threaded.

The means 20 for adjusting or expanding the bushing 19 is such that the bushing may be expanded to tightly fit the pin portion 22 and tightly fit the opening 14 without shifting or disturbing the retaining nut 30. The adjusting or expanding means 20 includes push pins or push rods 33 extending through openings 34 in the retaining nut 30. The openings 34 are circumferentially spaced and are inclined with respect to the longitudinal axis of the assembly so that the inner ends of the push rods 33 are adapted to engage or bear against the end of the bushing 19. The inner ends of the push rods 33 may be flat and normal to evenly bear on the inclined end face of the bushing. Heads 33ᵃ are provided on the outer ends of the rods 33 and project from the shoulder 40 at the inner ends of the portion 32. The rods 33 are shiftable or slidable in the openings 34 so that they are adapted to transmit inward thrusts or forces to the bushing 19. The openings 34 carrying the push rods 33 are preferably symmetrically or equally spaced as illustrated in Fig. 3 of the drawing.

A nut 37 is threaded on the portion 32 of the retaining nut 30 to actuate or act on the rods 33 to expand the bushing 19. A washer 38 is arranged on the stem portion 23 at the inner side of the nut 37. The washer 38 is adapted to cooperate with the heads 33ᵃ of the rods 33 and may be provided at its inner side with an annular inclined surface 39 for cooperating with the heads 33ᵃ. The washer 38 is free on the portion 32 so that it may shift thereon without rotating. The surface 39 is sufficiently wide to permit inward movement of the heads 33ᵃ during adjustment, such movement being caused by the inclination of the rods 33. The engagement of the rod heads 33ᵃ with the washer 38 may operate to hold the washer against turning when the nut 37 is threaded inwardly to adjust or expand the bushing 19. The heads 33ᵃ may prevent the rods 33 from falling from the opening 34 when the nut 30 is removed.

It is believed that the utility and practicability of the construction of the present invention will be understood from the foregoing detailed description. When the pin portion 22 with its bushing 19 has been inserted or assembled in the desired opening 14 of the crank arm 11 the retaining nut 30 may be threaded on the stem portion 26 to attach the crank pin 18 to the arm. The retaining nut 30 may be threaded to its proper position or setting without affecting adjustment of the bushing 19. To adjust or expand the bushing 19 the nut 37 is threaded inwardly on the portion 32 of the retaining nut 30. The inward movement of the nut 37 is transmitted to the bushing 19 through the washer 38 and push rods 33. This inward force or movement of the bushing 19 on the tapered portion 22 causes the bushing to expand outwardly against the wall of the opening 14 and to tightly bear on the pin portion 22. The nut 37 may be threaded inwardly to provide for the required or desired expansion of the bushing 19 without turning or disturbing the retaining nut 30. As described above the washer 38 may not turn during threading of the nut 37 so that the rods 33 are not subject to excessive twisting or lateral strains.

In the event that the assembly becomes loosened through wear or use the nut 37 may be easily threaded inwardly to expand the bushing 19 against the wall of the opening 14 and tighten it on the pin portion 22. The bushing 19 in being longitudinally split readily conforms to the wall of the opening 14 in the crank arm and is adapted to properly bear in openings that are out of round. Because of its adjustability or expansibility the bushing 19 is adapted to properly and tightly mount the pin portion 22 in openings varying considerably in diameter. The bushing 19 is resilient and when the pin portion 22 is removed from an opening 14 and introduced in another opening 14 the bushing 19 may again be employed to mount the pin portion in the opening. The construction is simple and inexpensive of manufacture and is very easy to assemble and adjust.

Having described only a typical form and application of my invention, I do not wish to be limited or restricted to the specific form and application herein set forth, but wish to reserve to myself any modifications or variations that may appear to those skilled in the art or fall within the scope of the following claims.

Having described my invention, I claim:

1. A crank pin for arrangement in an opening in a machine part including a body having a tapered portion, an expansible bushing for supporting said portion in the opening and having a tapered opening receiving said portion, a member on the pin for retaining said portion in the opening, and means movable on the member for forcing the bushing along said portion to expand the bushing.

2. A crank pin for arrangement in an opening in a machine part including a body having a tapered portion, a bushing for supporting said portion in the opening and having a tapered opening receiving said portion, a member on the pin for retaining said portion in the opening, and means for forcing the bushing along said portion to expand the bushing, said means including a threaded nut, and means transmitting force from the nut to the bushing.

3. A crank pin for arrangement in an opening in a machine part including a body having a tapered portion, a bushing for supporting said portion in the opening and having a tapered opening receiving said portion, a member on the pin for retaining said portion in the opening, the member having an opening inclined with respect to the longitudinal axis of the body, and means for forcing the bushing along said portion to expand the bushing, said means including a nut threaded on the member, and means for transmitting force from the nut to the bushing, the last mentioned means comprising a shiftable rod in the inclined opening.

4. A crank pin for arrangement in an opening in a machine part including a body having a tapered portion, a bushing for supporting said portion in the opening and having a tapered opening receiving said portion, a member on the pin for retaining said portion in the opening, and means for forcing the bushing along said portion to expand the bushing, said means including a nut threaded on the member, and a rod for transmitting force from the nut to the bushing.

5. A crank pin for arrangement in an opening in a machine part including a body having a tapered portion, an expansible bushing having an exterior adapted to fit the wall of the opening and a tapered opening receiving the tapered portion of the pin body, means for retaining the pin in the opening, and means for expanding the bushing including a threaded nut on the first mentioned means, and a rod shiftable in an opening in the first mentioned means and adapted to transmit force from the nut to the bushing whereby the nut is operable to force the bushing along said portion to expand it.

6. A crank pin for arrangement in an opening in a machine part including a pin body adapted for arrangement in the opening, a bushing for mounting the body in the opening and expansible by axial movement, a retaining nut on the body, a part threaded on the retaining nut, and means for transmitting force from the said part to the bushing to move the bushing axially.

7. A crank pin for arrangement in an opening in a machine part including a pin body adapted for arrangement in the opening, a bushing for mounting the body in the opening and expansible by axial movement, a retaining nut on the body having an opening, a nut threaded on the retaining nut, and shiftable rod in the opening of the retaining nut for transmitting force from the last named nut to the bushing to move the bushing axially.

8. A crank pin for arrangement in an opening in a machine part including a body having a tapered portion, a bushing for supporting said portion in the opening and having a tapered opening receiving said portion, the bushing having a substantially longitudinal slot whereby it is expansible by axial movement, a retaining nut on the body, and means for maintaining an axial expanding pressure on the bushing including a nut on the retaining nut.

9. A crank pin for arrangement in an opening in a machine part including a body having a tapered portion, a bushing for supporting said portion in the opening and having a tapered opening receiving said portion, the bushing having a substantially longitudinal slot whereby it is expansible by axial movement, a retaining nut on the body having spaced openings, a nut threaded on the retaining nut, and shiftable rods in the spaced openings for transmitting force from the last mentioned nut to the bushing.

10. A crank pin for arrangement in an opening in a machine part including a body having a tapered portion, a bushing for supporting said portion in the opening and having a tapered opening receiving said portion, the bushing having a substantially longitudinal slot whereby it is expansible by axial movement, a retaining nut on the body having spaced openings, a nut threaded on the retaining nut, shiftable rods in the spaced openings for transmitting force from the last mentioned nut to the bushing, and a washer interposed between the rods and the last mentioned nut.

DANIEL W. HOFERER.